(12) United States Patent
Morita et al.

(10) Patent No.: US 7,964,684 B2
(45) Date of Patent: *Jun. 21, 2011

(54) ANTIREFLECTION FILM FORMING COMPOSITION, ANTIREFLECTION FILM AND OPTICAL DEVICE

(75) Inventors: Kensuke Morita, Haibara-gun (JP); Makoto Muramatsu, Haibara-gun (JP); Kouji Tonohara, Minami-Ashigara (JP)

(73) Assignee: FUJIFILM Corporation, Tokyo (JP)

( * ) Notice: Subject to any disclaimer, the term of this patent is extended or adjusted under 35 U.S.C. 154(b) by 400 days.

This patent is subject to a terminal disclaimer.

(21) Appl. No.: 12/040,941

(22) Filed: Mar. 3, 2008

(65) Prior Publication Data

US 2008/0213602 A1 Sep. 4, 2008

(30) Foreign Application Priority Data

Mar. 2, 2007 (JP) ................................ 2007-052647

(51) Int. Cl.
*C08F 30/08* (2006.01)
(52) U.S. Cl. ........................................ 526/279; 428/447
(58) Field of Classification Search .................. 526/279; 428/447

See application file for complete search history.

(56) References Cited

U.S. PATENT DOCUMENTS

| 6,252,030 B1 * | 6/2001 | Zank et al. ....................... 528/31 |
| 7,732,038 B2 * | 6/2010 | Naito et al. .................... 428/138 |
| 2004/0120915 A1 * | 6/2004 | Yang et al. ................. 424/70.13 |
| 2005/0107541 A1 * | 5/2005 | Bening ......................... 525/242 |
| 2007/0054135 A1 * | 3/2007 | Morita et al. ................. 428/447 |

FOREIGN PATENT DOCUMENTS

| JP | 2000-334881 A | 12/2000 |
| JP | 2007 92019 | * 4/2007 |

* cited by examiner

*Primary Examiner* — Margaret G Moore
(74) *Attorney, Agent, or Firm* — Sughrue Mion, PLLC

(57) ABSTRACT

An antireflection film forming composition, includes: a polymerized product of Compound (I) having m number of RSi($O_{0.5}$)$_3$ units, in which m stands for an integer of from 8 to 16, and Rs each independently represents a non-hydrolyzable group, with the proviso that at least two of Rs each represents a vinyl- or ethynyl-containing group, wherein each of the RSi($O_{0.5}$)$_3$ units is linked to another RSi($O_{0.5}$)$_3$ unit while having an oxygen atom in common and constitutes a cage structure, and wherein, of solids contained in the composition, the polymerized product obtained by a polymerization reaction of Compound (I) amounts to 60 mass % or greater and Compound (I) amounts to 15 mass % or less.

19 Claims, No Drawings

ANTIREFLECTION FILM FORMING COMPOSITION, ANTIREFLECTION FILM AND OPTICAL DEVICE

BACKGROUND OF THE INVENTION

1. Field of the Invention

The present invention relates to an antireflection film forming composition, more specifically, to a composition for forming a low-refractive-index film having an adequately uniform thickness and useful as an antireflection film or the like in optical devices, an antireflection film and an optical device.

2. Description of the Related Art

Antireflection films have been used for preventing reflection of an outside light and enhancing an image quality during laser annealing or in a photoresist step for producing various display panels such as liquid crystal display panel, cold cathode fluorescent lamp panel and plasma display, solar cell panels, optical devices such as imaging element, thin film transistors, and thin-film single-crystal silicon solar cells.

Based on the optical theory of antireflection, antireflection films are classified into those made of a plurality of layers obtained by stacking on a substrate a high-refractive-index layer made of a metal oxide or the like and a low-refractive-index layer one after another and those made of a single layer having only a low-refractive-index layer made of an organic fluorine compound or an inorganic compound. In either type of antireflection films, there is a demand for the development of a low-refractive-index material made of a cured film excellent in scratch resistance, coating properties, and durability.

A method of employing dehydration condensation of a siloxane compound or forming pores by using a thermally decomposable compound is known as a method for producing a material having a lower refractive index. Such a method however poses problems such film shrinkage and degassing during baking.

An attempt to obtain a low-refractive-index film by applying a solution obtained by adding a low-molecular cage-type siloxane compound to an organic polymer is also known (refer to Japanese Patent Laid-Open No. 2000-334881). The method of adding a cage-type compound as a monomer is not sufficiently effective for reducing a refractive index and in addition, has problems such as worsening of a coated surface and large film thickness loss during baking.

SUMMARY OF THE INVENTION

An object of the invention is therefore to provide a composition for overcoming the above-described problems and a low-refractive-index material prepared using the composition; more specifically, to provide a composition for providing a film which causes less film shrinkage and degassing during curing, has an adequately uniform thickness, has a low refractive index, and is excellent in film properties such as film strength and is therefore suited for use as an antireflection film in optical devices and the like; an antireflection film prepared using the composition; and an optical device using the antireflection film.

It has been found that the above-described object can be accomplished by the following means:

(1) An antireflection film forming composition, comprising:

a polymerized product of Compound (I) having m number of $RSi(O_{0.5})_3$ units, in which m stands for an integer of from 8 to 16, and Rs each independently represents a non-hydrolyzable group, with the proviso that at least two of Rs each represents a vinyl- or ethynyl-containing group, wherein each of the $RSi(O_{0.5})_3$ units is linked to another $RSi(O_{0.5})_3$ unit while having an oxygen atom in common and constitutes a cage structure, and wherein, of solids contained in the composition, the polymerized product obtained by a polymerization reaction of Compound (I) amounts to 60 mass % or greater and Compound (I) amounts to 15 mass % or less.

(2) The antireflection film forming composition as described in (1) above, wherein a portion of a GPC chart of the solids contained in the composition from which the monomer Compound (I) is eliminated has a polystyrene-equivalent number-average molecular weight of 10,000 or greater and a polystyrene-equivalent weight average molecular weight of 300,000 or less.

(3) The antireflection film forming composition as described in (1) or (2) above, wherein the polymerized product is obtained by dissolving Compound (I) in an organic solvent to give a concentration of 15 mass % or less; and then reacting the vinyl or ethynyl groups in presence of a polymerization initiator.

(4) The antireflection film forming composition as described in (3) above, wherein the polymerized product is obtained by adding the polymerization initiator in portions or successively while keeping a temperature of a reaction mixture containing Compound (I) and the organic solvent at one-hour half-life temperature of the polymerization initiator or greater.

(5) The antireflection film forming composition as described in (3) or (4) above, wherein the organic solvent for polymerization is a solvent having an ester group in a molecule thereof.

(6) The antireflection film forming composition as described in any of (3) to (5) above, wherein the polymerization initiator is an azo compound.

(7) The antireflection film forming composition as described in (6) above, wherein the polymerization initiator is an azoester compound.

(8) The antireflection film forming composition as described in any of (1) to (7) above, further comprising an organic solvent.

(9) The antireflection film forming composition as described in any of (1) to (8) above, wherein based on a GPC chart of the solids contained in the composition, the solids are substantially free of a component having a molecular weight of 3,000,000 or greater.

(10) The antireflection film obtained from the composition as described in any of (1) to (9) above.

(11) The antireflection film obtained by a process comprising:

applying the composition as described in any of (1) to (9) onto a substrate; and then curing the composition.

(12) An antireflection film, comprising:

the antireflection film as described in (10) above; and a film having a refractive index higher by at least 0.05 than that of the antireflection film as described in (10) above.

(13) An optical device, comprising the antireflection film as described in (12) above.

DETAILED DESCRIPTION OF THE INVENTION

The composition of the invention contains a reaction product of Compound (I) having m number of $RSi(O_{0.5})_3$ units (in which m stands for an integer of from 8 to 16 and Rs each independently represents a non-hydrolyzable group, with the proviso that at least two of Rs each represents a vinyl- or ethynyl-containing group) each of which is linked to another $RSi(O_{0.5})_3$ unit while having an oxygen atom in common and constitutes a cage structure.

From the viewpoint of reducing a refractive index, m in Compound (I) stands for preferably 8, 10, 12, 14 or 16, more preferably 8, 10 or 12 from the viewpoint of availability.

The term "cage structure" as used herein means a molecule whose cavity is defined by a plurality of rings formed of covalently bonded atoms and in which all points present inside the cavity cannot leave the cavity without passing through the rings.

Examples of the cage structure represented by the formula (I) are shown in the following. A free bond in the following formulas indicates a bonding site of R.

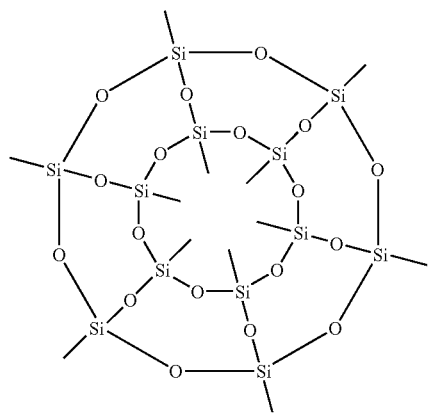
(Q-1)

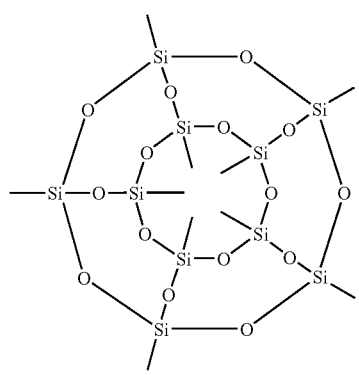
(Q-2)

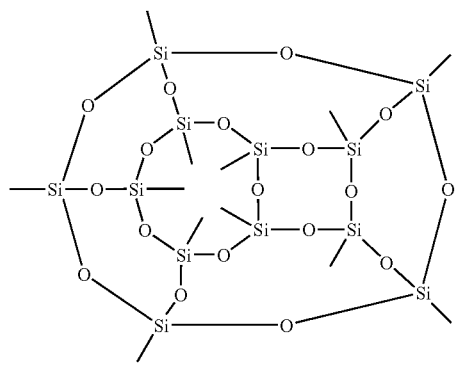
(Q-3)

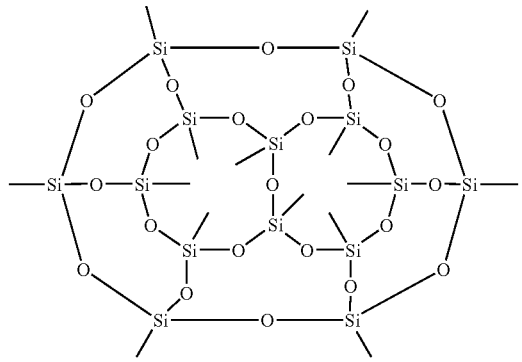
(Q-4)

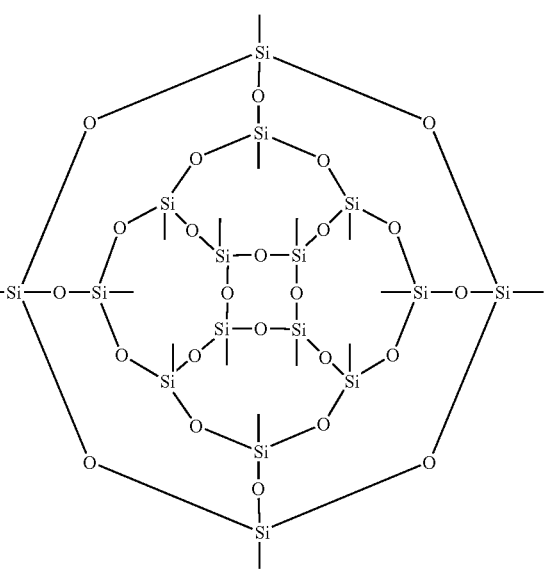
(Q-5)

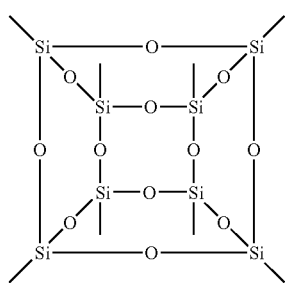
(Q-6)

-continued

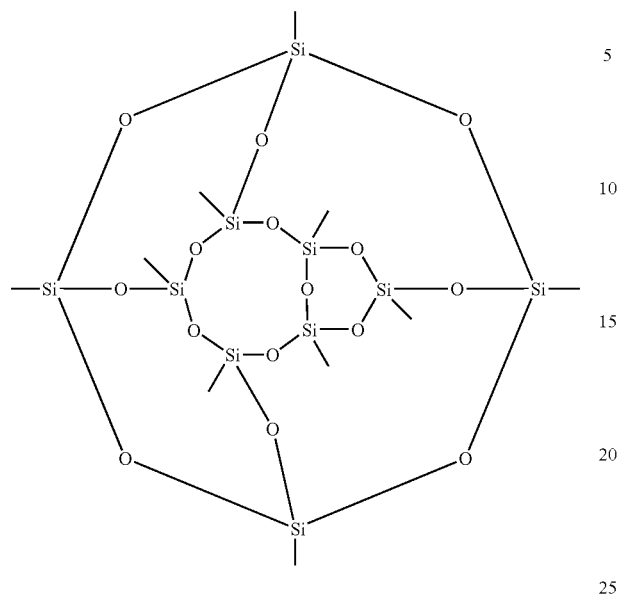
(Q-7)

In the compound (I), Rs each independently represents a non-hydrolyzable group.

The term "non-hydrolyzable group" as used herein means a group at least 95% of which remains without being hydrolyzed when brought into contact with 1 equivalent amount of neutral water at room temperature for one hour. A non-hydrolyzable group at least 99% of which remains without being hydrolyzed under the above conditions is preferred.

At least two of Rs are vinyl- or ethynyl-containing groups. Examples of the non-hydrolyzable group as R include alkyl groups (such as methyl, t-butyl, cyclopentyl and cyclohexyl), aryl groups (such as phenyl, 1-naphthyl and 2-naphthyl), vinyl group, ethynyl group, allyl group, and silyloxy groups (such as trimethylsilyloxy, triethylsilyloxy and t-butyldimethylsilyloxy).

Among the groups represented by Rs, at least two of the groups represented by Rs are vinyl- or ethynyl-containing groups, preferably at least two of the groups represented by Rs are vinyl-containing groups. When the groups represented by Rs contain a vinyl or ethynyl group, the vinyl or ethynyl group is preferably bonded, directly or via a divalent linking group, to a silicon atom to which R is to be bonded. Example of the divalent linking group include $-[C(R^{11})(R^{12})]_k-$, $-CO-$, $-O-$, $-N(R^{13})-$, $-S-$ and $-O-Si(R^{14})(R^{15})-$, and divalent linking groups available using them in any combination. In these formulas, $R^{11}$ to $R^{15}$ each independently represents a hydrogen atom, methyl group, ethyl group or phenyl group and k stands for an integer of from 1 to 6. Of these groups, $-[C(R^{11})(R^{12})]_k-$, $-O-$, $-O-Si(R^{14})(R^{15})-$, and divalent linking groups available using them in any combination are preferred.

In Compound (I), the vinyl or ethynyl group is preferably bonded directly to a silicon atom to which R is to be bonded.

With regard to Rs in Compound (I), it is more preferred that at least two vinyl groups are directly bonded to a silicon atom to which R is to be bonded; still more preferred that at least a half of Rs in Compound (I) are vinyl groups; and especially preferred that Rs are all vinyl groups.

Specific examples of Compound (I) include, but not limited to, the following compounds.

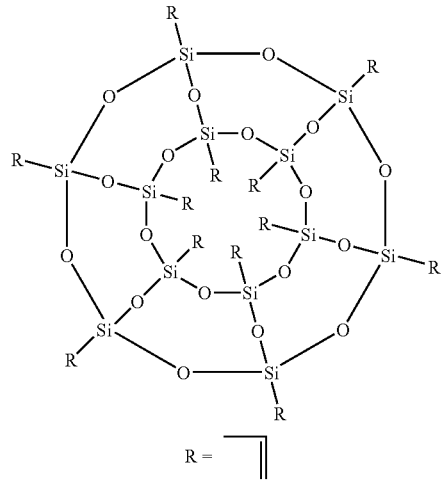
(I-a)

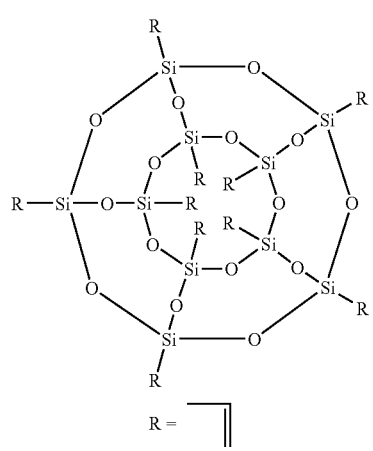
(I-b)

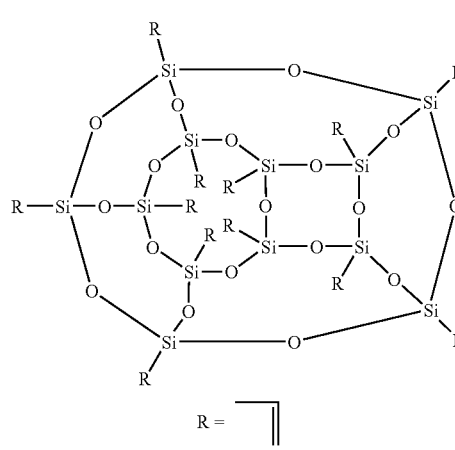
(I-c)

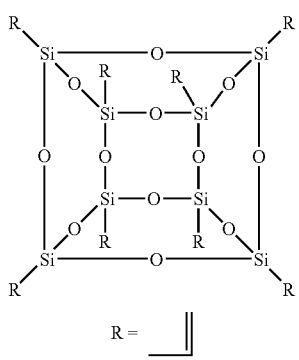
(I-d)
R = ethenyl
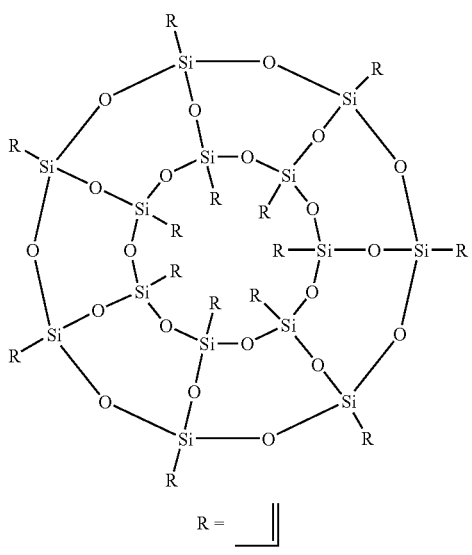
(I-e)
R = ethenyl
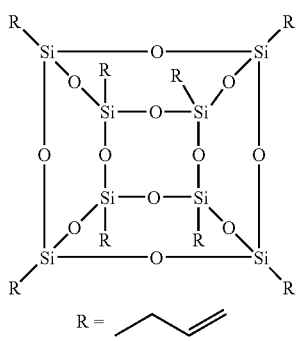
(I-f)
R = allyl
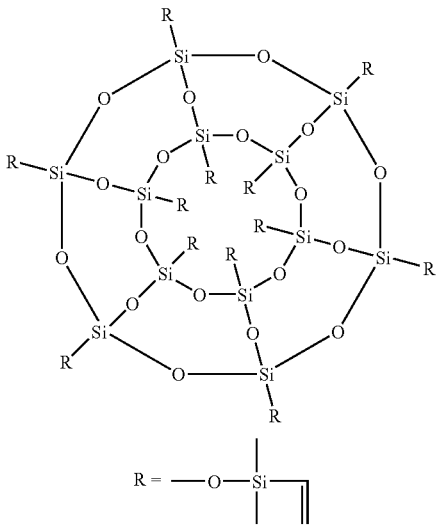
(I-g)
R = —O—Si(vinyl)
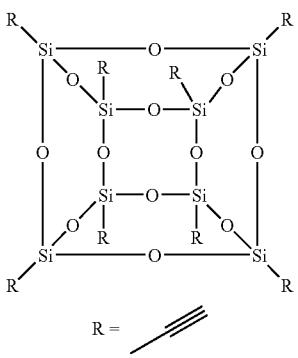
(I-h)
R = ethynyl
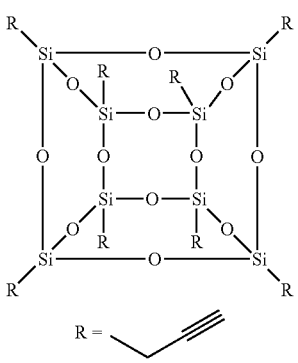
(I-i)
R = propargyl
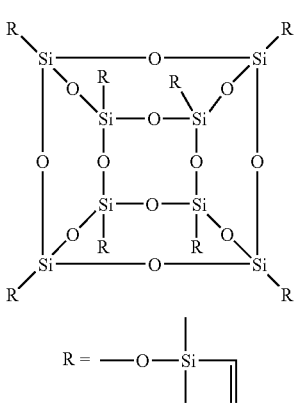
(I-j)
R = —O—Si(vinyl)

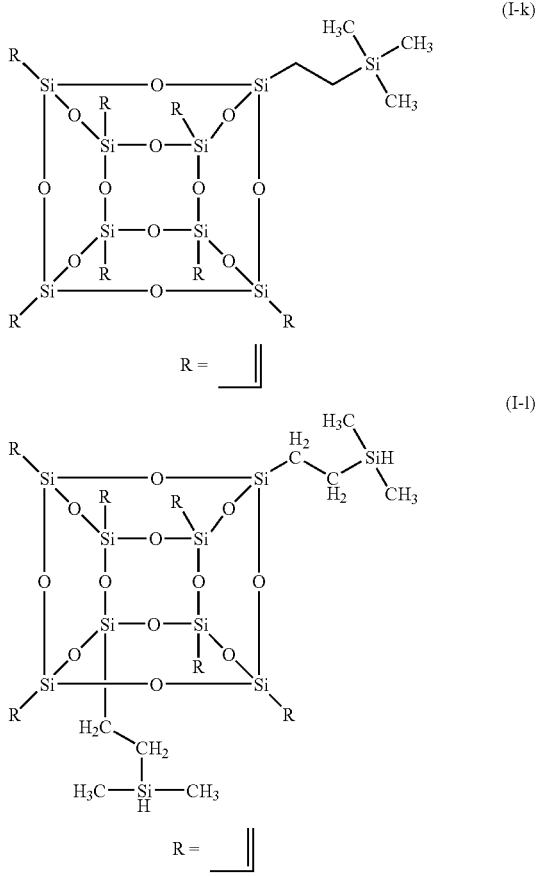

As Compound (1), either a commercially available compound or a compound synthesized in a known manner may be used.

It is also preferred that Rs of Compound (I) of the invention are each represented by the following formula (II). In this case, it can be synthesized by reacting a compound represented by the following formula (III) (which will hereinafter be called "Compound (III)") with a compound represented by the following formula (IV) (which will hereinafter be called "Compound (IV)").

$(R^1)_3$—Si—O— (II)

$[MO—Si(O_{0.5})_3]_m$ (III)

$(R^1)_3$—Si—Cl (IV)

The compound (III) can be synthesized, for example, by the process described in *Angew. Chem. Int. Ed. Engl.* 36(7), 743-745(1997).

In the above formulas, $R^1$s each independently represents a non-hydrolyzable group. Specific examples of the non-hydrolyzable group as $R^1$ include alkyl groups, aryl groups, vinyl group and ethynyl group, and m has the same meaning as in Compound (I). M represents a metal atom (for example, Na, K, Cu, Ni or Mn) or an onium cation (for example, tetramethylammonium). When M represents a polyvalent metal atom, a plurality of —O—$Si(O_{0.5})_3$s are bonded to the polyvalent metal atom M.

The reaction between the compound (III) with the compound (IV) is performed, for example, typically at from 0 to 180° C. for from 10 minute to 20 hours under stirring while adding the compound (III) and from 1 to 100 moles, per mole of the Si—OM groups contained in the compound (III), of the compound (IV) to a solvent.

As the solvent, organic solvents such as toluene, hexane, and tetrahydrofuran (THF) are preferred.

When the compound (III) is reacted with the compound (IV), a base such as triethylamine or pyridine may be added.

The composition of the invention may contain a plurality of Compounds (I) which are different from each other or a polymerized product thereof. In this case, it may be a copolymer composed of two or more Compounds (I) different from each other or a mixture of homopolymers. When the composition of the invention contains a copolymer composed of two or more different Compounds (I), the copolymer is preferably that of a mixture of two or more Compounds (I) selected from compounds (I) in which m stands for 8, 10 and 12, respectively.

The composition of the invention may be a copolymerized product with a compound other than Compound (I). The compound used in such a case has preferably a plurality of polymerizable carbon-carbon unsaturated bonds or SiH groups. Preferred examples of such a compound include vinylsilanes, vinylsiloxanes, phenylacetylenes and $[(HSiO_{0.5})_3]_8$.

The composition of the invention may be either in the solution form having Compound (I) or reaction product thereof dissolved in an organic solvent or in the solid form containing Compound (I) or reaction product thereof.

The polymerized products obtained by the reaction of Compounds (I) amount to, in total, preferably 60 mass % or greater, more preferably 70 mass % or greater, still more preferably 80 mass % or greater, most preferably 90 mass % or greater, of the solids contained in the composition of the invention. (In this specification, mass ratio is equal to weight ratio.) As the content of them in the solids is greater, a film having a lower refractive index can be formed.

The term "solids" as used herein means components which have remained after volatile components are subtracted from all the components contained in the composition. The volatile components include components that volatilize after decomposition into a low molecular compound. Examples of the volatile components include water, organic solvents and volatile additives.

Examples of the component contained in the solids of the invention but other than the polymerized product obtained by the reaction between Compounds (I) include Compound (I), components which are contained in the copolymerized product containing the reaction product of Compound (I) but are other than the reaction product of Compound (I), and non-volatile additives.

The amount of Compound (I) can be determined using a GPC chart, HPLC chart, NMR spectrum, UV spectrum or IR spectrum of the solid component. Amounts of the components in the copolymerized substance can be sometimes determined from their charged ratios, but can also be determined by subjecting the solid component, which has been purified if necessary, to NMR spectrum, UV spectrum, IR spectrum or elemental analysis.

The amount of the nonvolatile additive can be determined by using the amount of it added to the composition as an amount present in the solid component or from a GPC chart or HPLC chart of the solid component. It can also be determined by subjecting the solid component, which has been purified if necessary, to NMR spectrum, UV spectrum, IR spectrum or elemental analysis.

The solid component excluding them is the polymerized substance obtained by the reaction between Compounds (I).

In order to obtain a film having good surface conditions after application and not undergoing a large film thickness loss during baking, the amount of the compound (I) which has remained unreacted in the solids of the composition of the invention is preferably smaller.

The amount of the compound (I) in the solids is 15 mass % or less, preferably 10 mass % or less, most preferably 5 mass % or less.

A portion, in a GPC chart, of the solids contained in the composition of the invention excluding Compound (I) has a number-average molecular weight (Mn) of from 10,000 to 200,000, more preferably from 20,000 to 150,000, most preferably from 30,000 to 100,000.

A film having a lower refractive index can be formed when the number-average molecular weight is greater.

In the invention, "Waters 2695" (trade name) and a GPC column "KF-805L" (trade name; product of Shodex) were used for GPC and 50 µl of a tetrahydrofuran solution having a sample concentration of 0.5 mass % was poured while setting a column temperature at 40° C. and using tetrahydrofuran as an eluting solvent at a flow rate of 1 ml/min. A calibration curve of a monomer was constructed using integrated values obtained from an RI detector ("Waters 2414", trade name) and a monomer content in the solids was determined. The Mn, Mw and $M_{z-1}$ were calculated based on a calibration curve constructed using standard polystyrene.

The portion, in the GPC chart, of the solids contained in the composition of the invention excluding the Compound (I) monomer has MW of preferably from 30,000 to 300,000, more preferably from 40,000 to 210,000, most preferably from 50,000 to 160,000.

The (Z+1) average molecular weight ($M_{z+1}$) of the portion, in the GPC chart, of the solids contained in the composition of the invention excluding Compound (I) is preferably form 90,000 to 900,000, more preferably from 120,000 to 600,000, most preferably from 150,000 to 450,000.

Greater (Z+1) average molecular weights lead to deterioration in solubility of the resulting composition in an organic solvent and filtration properties through a filter, which may cause deterioration of surface properties of a coated film.

The composition having these average molecular weights within the above-described ranges provides a coated film with good surface conditions, has a low refractive index, has good solubility in an organic solvent and filteration properties through a filter, and enables formation of a low-refractive index film with good surface conditions.

From the viewpoints of solubility in an organic solvent, filterability through a filter and surface conditions of a coated film, the polymer of the invention is preferably substantially free of components having a molecular weight of 3,000,000 or greater, more preferably substantially free of components having a molecular weight of 2,000,000 or greater, most preferably free of components having a molecular weight of 1,000,000 or greater.

In the solid component of the composition of the invention, preferably from 10 to 90 mole %, more preferably from 20 to 80 mole %, most preferably from 30 to 70 mole % of the vinyl or ethynyl groups of Compound (I) remain unreacted.

To the reaction product of Compound (I) in the composition of the invention, from 0.1 to 40 mass %, more preferably from 0.1 to 20 mass %, still more preferably from 0.1 to 10 mass %, most preferably from 0.1 to 5 mass % of the polymerization initiator, additive or polymerization solvent may be bonded.

The amount of them may be determined by the NMR spectrum of the composition.

For preparation of the composition of the invention, Compound (I) is prepared preferably by utilizing a polymerization reaction between carbon-carbon unsaturated bonds.

It is especially preferred to dissolve Compound (I) in a solvent and then adding thereto a polymerization initiator to cause a reaction of a vinyl or ethynyl group.

Any polymerization reaction can be employed and examples include radical polymerization, cationic polymerization, anionic polymerization, ring-opening polymerization, polycondensation, polyaddition, addition condensation and polymerization in the presence of a transition metal catalyst.

The amount of Compound (I) which has remained at the time of completion of the polymerization reaction is preferably 25 mass % or less, more preferably 20 mass % or less, most preferably 15 mass % or less based on the addition amount of it. When these conditions are satisfied during polymerization, a film forming composition capable of providing a coated film having good surface conditions and undergoing a small film thickness loss during baking can be prepared in high yield.

The polymer has a weight average molecular weight (Mw), at the time of completion of the polymerization reaction, of preferably from 30,000 to 250,000, more preferably from 40,000 to 180,000, most preferably from 50,000 to 120,000.

The polymer has a (Z+1) average molecular weight ($M_{Z+1}$), at the time of completion of the polymerization reaction, of preferably from 90,000 to 900,000, more preferably from 120,000 to 600,000, most preferably from 150,000 to 450,000.

The polymer at the time of completion of the polymerization reaction is preferably substantially free of components having a molecular weight of 3,000,000 or greater, more preferably substantially free of components having a molecular weight of 2,000,000 or greater, most preferably free of components having a molecular weight of 1,000,000 or greater.

When these molecular weight conditions are satisfied at the time of polymerization, a film forming composition soluble in an organic solvent, having good filterability through a filter and capable of providing a low-refractive-index film can be prepared.

In order to satisfy the above-described molecular weight conditions, the concentration of Compound (I) during the polymerization reaction is preferably 15 mass % or less, more preferably 12 mass % or less, still more preferably 9 mass % or less, most preferably 6 mass % or less.

The productivity at the time of the reaction is better when the concentration of Compound (I) at the time of the polymerization is higher. In that context, the concentration of Compound (I) is preferably 0.1 mass % or greater, more preferably 1 mass % or greater at the time of the polymerization.

In the preparation process of the composition of the invention, the polymerization of Compound (I) is preferably followed by treatment such as removal of high molecular components by filtration or centrifugation, or purification by column chromatography.

In particular, it is preferred, as a preparation process of the composition of the invention, to subject the solid formed by the polymerization reaction to re-precipitation treatment to remove therefrom low molecular components and remaining Compound (I), thereby increasing the Mn and reducing the remaining amount of Compound (I).

The term "re-precipitation treatment" as used herein means collection, by filtration, of the composition of the invention which has been precipitated by adding a poor solvent (a solvent which does not substantially dissolve the composition of the invention therein) to the reaction mixture from which the reaction solvent has been distilled off as needed, adding dropwise the reaction mixture, from which the reaction solvent has been distilled off as needed, to a poor solvent, or dissolving the solid component in a good solvent and then adding the poor solvent to the resulting solution.

Examples of the good solvent include ethyl acetate, butyl acetate, toluene, methyl ethyl ketone and tetrahydrofuran. As the poor solvent, alcohols (methanol, ethanol and isopropyl alcohol), hydrocarbons (hexane and heptane) and water are preferred. The good solvent is used in an amount of preferably from 1 time to 50 times the mass, preferably from 2 times to 20 times the mass of the composition of the invention, while the poor solvent is used in an amount of preferably from 1 time to 200 times the mass, more preferably from 2 times to 50 times the mass of the composition of the invention.

It is preferred that the polymerization reaction of Compound (I) is performed in the presence of a non-metal polymerization initiator. For example, it can be polymerized in the presence of a polymerization initiator showing activity while generating a free radical such as carbon radical or oxygen radical by heating.

As the polymerization initiator, organic peroxides and organic azo compounds are especially preferred.

Preferred examples of the organic peroxides include ketone peroxides such as "PERHEXA H", peroxyketals such as "PERHEXA TMH", hydroperoxides such as "PERBUTYL H-69", dialkylperoxides such as "PERCUMYL D", "PERBUTYL C" and "PERBUTYL D", diacyl peroxides such as "NYPER BW", peroxy esters such as "PERBUTYL Z" and "PERBUTYL L", and peroxy dicarbonates such as "PEROYL TCP", (each, trade name; commercially available from NOF Corporation), diisobutyryl peroxide, cumylperoxyneodecanoate, di-n-propylperoxydicarbonate, diisopropylperoxydicarbonate, di-sec-butylperoxydicarbonate, 1,1,3,3-tetramethylbutylperoxyneodecanoate, di(4-t-butylchlorohexyl)peroxydicarbonate, di(2-ethylhexyl) peroxydicarbonate, t-hexylperoxyneodecanoate, t-butylperoxyneodecanoate, t-butylperoxyneoheptanoate, t-hexylperoxypivalate, t-butylperoxypivalate, di(3,5,5-trimethylhexanoyl)peroxide, dilauroyl peroxide, 1,1,3,3-tetramethylbutylperoxy-2-ethylhexanoate, disuccinic acid peroxide, 2,5-dimethyl-2,5-di(2-ethylhexanoylperoxy)hexane, t-hexylperoxy-2-ethylhexanoate, di(4-methylbenzoyl)peroxide, t-butylperoxy-2-ethylhexanoate, di(3-methylbenzoyl) peroxide, benzoyl(3-methylbenzoyl)peroxide, dibenzoyl peroxide, 1,1-di(t-butylperoxy)-2-methylcyclohexane, 1,1-di(t-hexylperoxy)-3,3,5-trimethylcyclohexane, 1,1-di(t-hexylperoxy)cyclohexane, 1,1-di(t-butylperoxy)cyclohexane, 2,2-di(4,4-di-(t-butylperoxy)cyclohexyl)propane, t-hexylperoxyisopropyl monocarbonate, t-butylperoxymaleic acid, t-butylperoxy-3,5,5-trimethylhexanoate, t-butylperoxylaurate, t-butylperoxyisopropylmonocarbonate, t-butylperoxy-2-ethylhexylmonocarbonate, t-hexylperoxybenzoate, 2,5-dimethyl-2,5-di(benzoylperoxy) hexane, t-butylperoxyacetate, 2,2-di-(t-butylperoxy)butane, t-butylperoxybenzoate, n-butyl-4,4-di-t-butylperoxyvalerate, di(2-t-butylperoxyisopropyl)benzene, dicumyl peroxide, di-t-hexyl peroxide, 2,5-dimethyl-2,5-di(t-butylperoxy)hexane, t-butylcumyl peroxide, di-t-butyl peroxide, p-methane hydroperoxide, 2,5-dimethyl-2,5-di(t-butylperoxy) hexine-3, diisopropylbenzene hydroperoxide, 1,1,3,3-tetramethylbutyl hydroperoxide, cumene hydroperoxide, t-butyl hydroperoxide, 2,3-dimethyl-2,3-diphenylbutane, 2,4-dichlorobenzoyl peroxide, o-chlorobenzoyl peroxide, p-chlorobenzoyl peroxide, tris-(t-butylperoxy)triazine, 2,4,4-trimethylpentylperoxyneodecanoate, α-cumylperoxyneodecanoate, t-amylperoxy-2-ethylhexanoate, t-butylperoxyisobutyrate, di-t-butylperoxyhexahydroterephthalate, di-t-butylperoxytrimethyladipate, di-3-methoxybutylperoxydicarbonate, di-isopropylperoxydicarbonate, t-butylperoxyisopropylcarbonate, 1,6-bis(t-butylperoxycarbonyloxy)hexane, diethylene glycol bis(t-butylperoxycarbonate), t-hexylperoxyneodecanoate, and "Luperox 11" (trade name; commercially available from ARKEMA YOSHITOMI).

Preferred examples of the organic azo compound include azonitrile compounds such as "V-30", "V-40", "V-59", "V-60", "V-65" and "V-70", azoamide compounds such as "VA-080", "VA-085", "VA-086", "VF-096", "VAm-110" and "VAm-111", cyclic azoamidine compounds such as "VA-044" and "VA-061", azoamidine compounds such as "V-50" and VA-057", azoester compounds such as "V-601" and "V-401" (each, trade name, commercially available from Wako Pure Chemical Industries), 2,2-azobis(4-methoxy-2,4-dimethylvaleronitrile), 2,2-azobis(2,4-dimethylvaleronitrile), 2,2-azobis(2-methylpropionitrile), 2,2-azobis(2,4-dimethylbutyronitrile), 1,1-azobis(cyclohexane-1-carbonitrile), 1-[(1-cyano-1-methylethyl)azo]formamide, 2,2-azobis{2-methyl-N-[1,1-bis (hydroxymethyl)-2-hydroxyethyl]propionamide}, 2,2-azobis[2-methyl-N-(2-hydroxybutyl) propionamide], 2,2-azobis[N-(2-propenyl)-2-methylpropionamide], 2,2-azobis (N-butyl-2-methylpropionamide), 2,2-azobis(N-cyclohexyl-2-methylpropionamide), 2,2-azobis[2-(2-imidazolin-2-yl) propane]dihydrochloride, 2,2-azobis[2-(2-imidazolin-2-yl)] propane]disulfate dihydrate, 2,2-azobis {2-[1-(2-hydroxyethyl)-2-imidazolin-2-yl]propane}dihydrochloride, 2,2-azobis[2-[2-imidazolin-2-yl]propane], 2,2-azobis (1-imino-1-pyrrolidino-2-methylpropane)dihydrochloride, 2,2-azobis (2-methylpropionamidine)dihydrochloride, 2,2-azobis[N-(2-carboxyethyl)-2-methylpropionamidine]tetrahydrate, dimethyl-2,2-azobis(2-methylpropionate), 4,4-azobis(4-cyanovaleric acid) and 2,2-azobis (2,4,4-trimethylpentane).

As the polymerization initiator, organic azo compounds are preferred in consideration of the safety as a reagent itself and reproducibility of the molecular weight in the polymerization reaction. Of these, azo ester compounds such as "V-601" are most preferred because a harmful cyano group is not incorporated in the polymer.

A ten-hour half-life temperature of the polymerization initiator is preferably 100° C. or less. When the ten-hour half-life temperature is 100° C. or less, remaining of the polymerization initiator upon completion of the reaction can be avoided easily.

In the invention, the polymerization initiators may be used either singly or in combination.

The amount of the polymerization initiator(s) is preferably from 0.0001 to 2 moles, more preferably from 0.003 to 1 mole, especially preferably from 0.001 to 0.5 mole per mole of the monomer.

As the solvent to be used in the polymerization reaction, any solvent is usable insofar as it can dissolve Compound (I) therein at a required concentration and has no adverse effect on the properties of a film formed from the polymer. In the following description, the term "ester solvent", for example, means a solvent having in the molecule thereof an ester group.

Examples include water, alcohol solvents such as methanol, ethanol and propanol, ketone solvents such as alcohol acetone, methyl ethyl ketone, methyl isobutyl ketone, cyclohexanone and acetophenone; ester solvents such as methyl acetate, ethyl acetate, propyl acetate, isopropyl acetate, butyl acetate, pentyl acetate, hexyl acetate, methyl propionate, ethyl propionate, propylene glycol monomethyl ether acetate, γ-butyrolactone and methyl benzoate; ether solvents such as dibutyl ether, anisole and tetrahydrofuran; aromatic hydrocarbon solvents such as toluene, xylene, mesitylene, 1,2,4,5-tetramethylbenzene, pentamethylbenzene, isopropylbenzene, 1,4-diisopropylbenzene, t-butylbenzene, 1,4-di-t-butylbenzene, 1,3,5-triethylbenzene, 1,3,5-tri-t-butylbenzene, 4-t-butyl-orthoxylene, 1-methylnaphthalene and 1,3,5-triisopropylbenzene; amide solvents such as N-methylpyrrolidinone and dimethylacetamide; halogen solvents such as carbon tetrachloride, dichloromethane, chloroform, 1,2-dichloroethane, chlorobenzene, 1,2-dichlorobenzene and 1,2,4-trichlorobenzene; and aliphatic hydrocarbon solvents such as hexane, heptane, octane and cyclohexane. Of these, more preferred are ester solvents, of which methyl acetate, ethyl acetate, propyl acetate, isopropyl acetate, butyl acetate, pentyl acetate, hexyl acetate, methyl propionate, ethyl propionate, propylene glycol monomethyl ether acetate, γ-butyrolactone, and methyl benzoate are more preferred, with ethyl acetate and butyl acetate being especially preferred.

These solvents may be used either singly or in combination.

The organic solvent has preferably a boiling point of 75° C. or greater but not greater than 140° C. in order to heat the reaction mixture to a temperature necessary for decomposing the polymerization initiator at the time of reaction and distill off the organic solvent after completion of the reaction.

In the invention, the polymerization initiator may be added all at once, in portions or continuously. The latter two methods are preferred because they enable an increase in the molecular weight and in addition, are advantageous from the viewpoint of the film strength.

It is especially preferred from the viewpoint of film strength and reproducibility of the molecular weight at the time of the polymerization reaction to add the polymerization initiator in portions or continuously while keeping the reaction mixture composed of Compound (I) and organic solvent at the one-hour half-life temperature of the polymerization initiator or greater.

The conditions most suited for the polymerization reaction in the invention differ, depending on the kind or concentration of the polymerization initiator, monomer or solvent. The polymerization reaction is performed preferably at an inner temperature of from 0 to 200° C., more preferably from 40 to 170° C., especially preferably from 70 to 140° C. for a period of preferably from 1 to 50 hours, more preferably from 2 to 20 hours, especially preferably from 3 to 10 hours.

To suppress the inactivation of the polymerization initiator which will otherwise occur by oxygen, the reaction is performed preferably in an inert gas atmosphere (for example, nitrogen or argon). The oxygen concentration upon reaction is preferably 100 ppm or less, more preferably 50 ppm or less, especially preferably 20 ppm or less.

The composition of the invention is preferably soluble in an organic solvent. The term "soluble in an organic solvent" as used herein means that 5 mass % or greater of the composition of the invention dissolves at 25° C. in a solvent selected from cyclohexanone, methyl ethyl ketone, methyl isobutyl ketone, propylene glycol monomethyl ether acetate, propylene glycol monomethyl ether and γ-butyrolactone. Preferably 10 mass % or greater, more preferably 20 mass % or greater of the composition dissolves in the solvent.

When the composition of the invention is prepared, the reaction mixture after the polymerization reaction of Compound (I) may be used as is as the composition of the invention but it is preferred to distill the reaction mixture to remove the reaction solvent and use it as the composition. It is also preferred to use it after re-precipitation treatment.

The reaction mixture is concentrated preferably by heating and/or pressure reduction in a rotary evaporator, distiller or reaction apparatus used for the polymerization reaction. The temperature of the reaction mixture at the time of concentration is typically from 0 to 180° C., preferably from 10 to 140° C., more preferably from 20 to 100° C., most preferably from 30 to 60° C. The pressure at the time of concentration is typically from 0.133 Pa to 100 kPa, preferably from 1.33 Pa to 13.3 kPa, more preferably from 1.33 Pa to 1.33 kPa.

When the reaction mixture is concentrated, it is concentrated until the solid content in the reaction mixture reaches preferably 10 mass % or greater, more preferably 30 mass % or greater, most preferably 50 mass % or greater.

To the composition of the invention or during the preparation of the composition, a polymerization inhibitor may be added to suppress excessive polymerization. Examples of the polymerization inhibitor include 4-methoxyphenol and catechol.

In the invention, it is preferred that the polymer of Compound (I) is dissolved in an appropriate solvent and then the resulting solution is applied to a substrate. Examples of the usable solvent include ethylene dichloride, cyclohexanone, cyclopentanone, 2-heptanone, methyl isobutyl ketone, γ-butyrolactone, methyl ethyl ketone, methanol, ethanol, dimethylimidazolidinone, ethylene glycol monomethyl ether, ethylene glycol monoethyl ether, ethylene glycol dimethyl ether, 2-methoxyethyl acetate, ethylene glycol monoethyl ether acetate, propylene glycol monomethyl ether (PGME), propylene glycol monomethyl ether acetate (PGMEA), tetraethylene glycol dimethyl ether, triethylene glycol monobutyl ether, triethylene glycol monomethyl ether, isopropanol, ethylene carbonate, ethyl acetate, butyl acetate, methyl lactate, ethyl lactate, methyl methoxypropionate, ethyl ethoxypropionate, methyl pyruvate, ethyl pyruvate, propyl pyruvate, N,N-dimethylformamide, dimethylacetamide, dimethylsulfoxide, N-methylpyrrolidone, tetrahydrofuran, diisopropylbenzene, toluene, xylene, and mesitylene. These solvents may be used either singly or as a mixture.

Of these, preferred are propylene glycol monomethyl ether acetate, propylene glycol monomethyl ether, 2-heptanone, cyclohexanone, γ-butyrolactone, ethylene glycol monomethyl ether, ethylene glycol monoethyl ether, ethylene glycol monoethyl ether acetate, propylene glycol monomethyl ether, propylene glycol monoethyl ether, ethylene carbonate, butyl acetate, methyl lactate, ethyl lactate, methyl methoxypropionate, ethyl ethoxypropionate, N-methylpyrrolidone, N,N-dimethylformamide, tetrahydrofuran, methyl isobutyl ketone, xylene, mesitylene and diisopropylbenzene.

A solution obtained by dissolving the composition of the invention in an appropriate solvent is also embraced in the scope of the composition of the invention. A total solid concentration in the solution of the invention is preferably from 1 to 30 mass % and is regulated as needed according to the purpose of use. When the total solid concentration of the composition is within a range of from 1 to 30 mass %, the thickness of a coated film falls within an appropriate range, and a coating solution has better storage stability.

The composition of the invention may contain a polymerization initiator, but the composition not containing a polymerization initiator is preferred because it has better storage stability.

When the composition of the invention must be cured at a low temperature, however, it preferably contains a polymerization initiator. In such a case, polymerization initiators similar to those cited above can be employed. Also an initiator which induces polymerization by radiation may also be utilized for this purpose.

A compound which generates active species when it is exposed to radiation (which will hereinafter be called "photopolymerization initiator") is, for example, a photoradical generator which generates radicals as active species.

The term "radiation" as used herein is defined as an energy beam capable of decomposing a compound generating active species to generate the active species. Examples of such radiation include light energy beams, e.g., visible light, ultraviolet rays, infrared rays, X-rays, α rays, β rays and γ rays. Use of ultraviolet rays is preferred because they have a certain level of energy, have a high curing speed, and need a small and relatively inexpensive irradiator.

Examples of the photoradical initiator include acetophenone, acetophenonebenzylketal, anthraquinone, 1-(4-isopropylphenyl)-2-hydroxy-2-methylpropan-1-one, carbazole, xanthone, 4-chlorobenzophenone, 4,4'-diaminobenzophenone, 1,1-dimethoxydeoxybenzoin, 3,3'-dimethyl-4-methoxybenzophenone, thioxanthone, 2,2-dimethoxy-2-phenylacetophenone, 1-(4-dodecylphenyl)-2-hydroxy-2-methylpropan-1-one, 2-methyl-1-[4-(methylthio)phenyl]-2-morpholinopropan-1-one, triphenylamine, 2,4,6-trimethylbenzoyldiphenylphosphine oxide, 1-hydroxycyclohexylphenylketone, 2-hydroxy-2-methyl-1-phenylpropan-1-one, fluorenone, fluorene, benzaldehyde, benzoinethylether, benzoinpropylether, benzophenone, Michler's ketone, 3-methylacetophenone, 3,3',4,4'-tetra(tert-butylperoxycarbonyl)benzophenone (BTTB), 2-(dimethylamino)-[1-[4-(morpholinyl)phenyl]-2-phenylmethyl]-1-butanone, 4-benzoyl-4'-methyldiphenylsulfide, benzyl and a combination of BTTB with a pigment sensitizer such as xanthene, thioxanthene, coumalin, and ketocoumalin.

Of these photopolymerization initiators, preferred ones are 2,2-dimethoxy-2-phenylacetophenone, 2-hydroxy-2-methyl-1-phenylpropan- 1-one, 1-hydoxycyclohexylphenylketone, 2,4,6-trimethylbenzoyldiphenylphosphine oxide, 2-methyl-1-[4-(methylthio)phenyl]-2-morpholinopropan-1-one, and 2-(dimethylamino)-1-[4-(morpholinyl)phenyl-2-phenylmethyl]-1-butanone, of which 1-hydoxycyclohexylphenylketone, 2-methyl-1-[4-(methylthio)phenyl]-2-morpholinopropan-1-one and 2-(dimethylamino)-1-[4-(morpholinyl) phenyl-2-phenylmethyl]-1-butanone are more preferred.

The polymerization initiator for film curing is added in an amount of preferably from 0.01 to 20 mass %, more preferably from 0.05 to 10 parts by mass, still more preferably from 0.1 to 5 parts by mass, each based on the polymerized product of Compound (I).

The composition of the invention may contain another vinyl monomer. Examples of it include olefins (such as ethylene, propylene, isoprene, vinyl chloride and vinylidene chloride), acrylate esters (such as methyl acrylate, ethyl acrylate, 2-ethylhexyl acrylate, and 2-hydroxyethyl acrylate), methacrylate esters (such as methyl methacrylate, ethyl methacrylate, butyl methacrylate, and 2-hydroxyethyl methacrylate), styrene derivatives (such as styrene, p-hydroxymethylstyrene, and p-methoxystyrene), vinyl ethers (such as methyl vinyl ether, ethyl vinyl ether, cyclohexyl vinyl ether, hydroxyethyl vinyl ether, and hydroxybutyl vinyl ether), vinyl esters (such as vinyl acetate, vinyl propionate, and vinyl cinnamate), unsaturated carboxylic acids (such as acrylic acid, methacrylic acid, crotonic acid, maleic acid and itaconic acid), acrylamides (such as N,N-dimethylacrylamide, N-tert-butyl acrylamide, and N-cyclohexylacrylamide), methacrylamides (such as N,N-dimethylmethacrylamide), and acrylonitrile. The composition of the invention may contain preferably a polyfunctional monomer such as DPHA (dipentaerythrithol hexaacrylate)

An amount of the vinyl monomer is preferably from 0.01 to 20 mass %, more preferably from 0.05 to 10 parts by mass, still more preferably from 0.1 to 5 parts by mass based on the amount of the polymerized product of Compound (I).

The content of metals, as an impurity, of the composition of the invention is preferably as small as possible. The metal content of the composition can be measured with high sensitivity by ICP-MS and in this case, the content of metals other than transition metals is preferably 30 ppm or less, more preferably 3 ppm or less, especially preferably 300 ppb or less. The content of the transition metal is preferably as small as possible because it accelerates oxidation by its high catalytic capacity and the oxidation reaction in the prebaking or thermosetting step raises the refractive index of the film obtained by the invention. The content of the transition metal is preferably 10 ppm or less, more preferably 1 ppm or less, especially preferably 100 ppb or less.

The metal concentration of the composition can also be evaluated by subjecting a film obtained using the composition of the invention to total reflection fluorescent X-ray analysis. When W ray is employed as an X-ray source, metal elements such as K, Ca, Ti, Cr, Mn, Fe, Co, Ni, Cu, Zn, and Pd can be observed. Their concentration is preferably from $100 \times 10^{10}$ $cm^{-2}$ or less, more preferably $50 \times 10^{10}$ $cm^{-2}$ or less, especially preferably $10 \times 10^{10}$ $cm^{-2}$ or less. In addition, Br, that is, a halogen can also be observed. Its remaining amount is preferably $10,000 \times 10^{10}$ $cm^{-2}$ or less, more preferably $1,000 \times 10^{10}$ $cm^{-2}$ or less, especially preferably $400 \times 10^{10}$ $cm^{-2}$ or less. Moreover, Cl can also be observed as a halogen. Its remaining amount is preferably $100 \times 10^{10}$ $cm^{-2}$ or less, more preferably $50 \times 10^{10}$ $cm^{-2}$ or less, especially preferably $10 \times 10^{10}$ $cm^{-2}$ or less.

To the composition of the invention, additives such as colloidal silica, surfactant, silane coupling agent and adhesive agent may be added without impairing the properties (such as heat resistance, mechanical strength, application properties and adhesion properties) of a low-refractive-index material obtained from the composition.

Any colloidal silica may be used in the invention. For example, a dispersion obtained by dispersing high-purity silicic anhydride in a hydrophilic organic solvent or water and having typically an average particle size of from 5 to 30 nm, preferably from 10 to 20 nm and a solid concentration of from about 5 to 40 mass % can be used.

Any surfactant may be added in the invention. Examples include nonionic surfactants, anionic surfactants and cationic surfactants. Further examples include silicone surfactants, fluorosurfactants, polyalkylene oxide surfactants, and acrylic surfactants. In the invention, these surfactants may be used either singly or in combination. As the surfactant, silicone surfactants, nonionic surfactants, fluorosurfactants and acrylic surfactants are preferred, with silicone surfactants being especially preferred.

The amount of the surfactant to be used in the invention is preferably from 0.01 mass % or greater but not greater than 1 mass %, more preferably from 0.1 mass % or greater but not greater than 0.5 mass % based on the total amount of the film-forming coating solution.

The term "silicone surfactant" as used herein means a surfactant containing at least one Si atom. Any silicone surfactant may be used in the invention, but it has preferably a structure containing an alkylene oxide and dimethylsiloxane, more preferably a structure containing the following chemical formula:

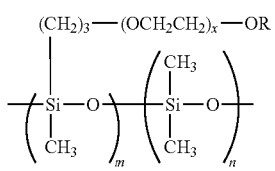

In the above formula, $R^1$ represents a hydrogen atom or a $C_{1-5}$ alkyl group, x stands for an integer of from 1 to 20, and m and n each independently represents an integer of from 2 to 100. A plurality of $R^1$s may be the same or different.

Examples of the silicone surfactant to be used in the invention include "BYK 306", "BYK 307" (each, trade name; product of BYK Chemie), "SH7PA", "SH21PA", "SH28PA", and "SH30PA" (each, trade name; product of Dow Corning Toray Silicone) and Troysol S366 (trade name; product of Troy Chemical).

As the nonionic surfactant to be used in the invention, any nonionic surfactant is usable. Examples include polyoxyethylene alkyl ethers, polyoxyethylene aryl ethers, polyoxyethylene dialkyl esters, sorbitan fatty acid esters, fatty-acid-modified polyoxyethylenes, and polyoxyethylene-polyoxypropylene block copolymers.

As the fluorosurfactant to be used in the invention, any fluorosurfactant is usable. Examples include perfluorooctyl polyethylene oxide, perfluorodecyl polyethylene oxide and perfluorododecyl polyethylene oxide.

As the acrylic surfactant to be used in the invention, any acrylic surfactant is usable. Examples include (meth)acrylic acid copolymers.

Any silane coupling agent may be used in the invention. Examples include 3-glycidyloxypropyltrimethoxysilane, 3-aminoglycidyloxypropyltriethoxysilane, 3-methacryloxypropyltrimethoxysilane, 3-glycidyloxypropylmethyldimethoxysilane, 1-methacryloxypropylmethyldimethoxysilane, 3-aminopropyltrimethoxysilane, 3-aminopropyltriethoxysilane, 2-aminopropyltrimethoxysilane, 2-aminopropyltriethoxysilane, N-(2-aminoethyl)-3-aminopropyltrimethoxysilane, N-(2-aminoethyl)-3-aminopropylmethyldimethoxysilane, 3-ureidopropyltrimethoxysilane, 3-ureidopropyltriethoxysilane, N-ethoxycarbonyl-3-aminopropyltrimethoxysilane, N-ethoxycarbonyl-3-aminopropyltriethoxysilane, N-triethoxysilylpropyltriethylenetriamine, N-trimethoxysilylpropyltriethylenetriamine, 10-trimethoxysilyl-1,4,7-triazadecane, 10-triethoxysilyl-1,4,7-triazadecane, 9-trimethoxysilyl-3,6-diazanonyl acetate, 9-triethoxysilyl-3,6-diazanonyl acetate, N-benzyl-3-aminopropyltrimethoxysilane, N-benzyl-3-aminopropyltriethoxysilane, N-phenyl-3-aminopropyltrimethoxysilane, N-phenyl-3-aminopropyltriethoxysilane, N-bis(oxyethylene)-3-aminopropyltrimethoxysilane, and N-bis(oxyethylene)-3-aminopropyltriethoxysilane. In the invention, these silane coupling agents may be used either singly or in combination.

In the invention, any adhesion promoter may be used. Examples include trimethoxysilylbenzoic acid, γ-methacryloxypropyltrimethoxysilane, vinyltriacetoxysilane, vinyltrimethoxysilane, γ-isocyanatopropyltriethoxysilane, γ-glycidoxypropyltrimethoxysilane, β-(3,4-epoxycyclohexyl)ethyltrimethoxysilane, trimethoxyvinylsilane, γ-aminopropyltriethoxysilane, aluminum monoethylacetoacetate disopropylate, vinyltris(2-methoxyethoxy)silane, N-(2-aminoethyl)-3-aminopropylmethyldimethoxysilane, N-(2-aminoethyl)-3-aminopropyltrimethoxysilane, 3-chloropropylmethyldimethoxysilane, 3-chloropropyltrimethoxysilane, 3-methacryloxypropyltrimethoxysilane, 3-mercaptopropyltrimethoxysilane, trimethylchlorosilane, dimethylvinylchlorosilane, methyldiphenylchlorosilane, chloromethyldimethylchlorosilane, trimethylmethoxysilane, dimethyldiethoxysilane, methyldimethoxysilane, dimethylvinylethoxysilane, diphenyldimethoxysilane, phenyltriethoxysilane, hexamethyldisilazane, N,N'-bis(trimethylsilyl)urea, dimethyltrimethylsilylamine, trimethylsilylimidazole, vinyltrichlorosilane, benzotriazole, benzimidazole, indazole, imidazole, 2-mercaptobenzimidazole, 2-mercaptobenzothiazole, 2-mercaptobenzoxazole, urazole, thiourasil, mercaptoimidazole, mercaptopyrimidine, 1,1-dimethylurea, 1,3-dimethylurea and thiourea compounds. Functional silane coupling agents are preferred as an adhesion promoter. The amount of the adhesion promoter is preferably 10 parts by mass or less, especially preferably from 0.05 to 5 parts by mass, based on 100 parts by mass of the total solid content.

In order to obtain a film having a lowered refractive index, it is also possible to form a porous film by using a pore forming factor to the extent permitted by the mechanical strength of the film.

Although no particular limitation is imposed on the pore forming factor as an additive to serve as a pore forming agent, a non-metallic compound is preferred. It must satisfy both the solubility in a solvent to be used for a low-refractive-index film-forming coating solution and compatibility with the polymer of the invention.

As the pore forming agent, polymers are usable. Examples of the polymer usable as the pore forming agent include polyvinyl aromatic compounds (such as polystyrene, polyvinylpyridine and halogenated polyvinyl aromatic compounds), polyacrylonitrile, polyalkylene oxides (such as polyethylene oxide and polypropylene oxide), polyethylene, polylactic acid, polysiloxane, polycaprolactone, polycaprolactam, polyurethane, polymethacrylates (such as polymethyl methacrylate), polymethacrylic acid, polyacrylates (such as polymethyl acrylate), polyacrylic acid, polydienes (such as polybutadiene and polyisoprene), polyvinyl chloride, polyacetal and amine-capped alkylene oxides. In addition, also usable are polyphenylene oxide, poly(dimethylsiloxane), polytetrahydrofuran, polycyclohexylethylene, polyethyloxazoline, polyvinylpyridine and polycaprolactone.

In particular, the polystyrene is suited as the pore forming agent. As the polystyrene, anionically polymerized polystyrene, syndiotactic polystyrene, and unsubstituted or substituted polystyrene (for example, poly(α-methylstyrene)) are usable, of which unsubstituted polystyrene is preferred.

As the pore forming gent, thermoplastic polymers are also usable. Examples of the thermoplastic pore forming polymer include polyacrylates, polymethacrylates, polybutadiene, polyisoprene, polyphenylene oxide, polypropylene oxide, polyethylene oxide, poly(dimethylsiloxane), polytetrahydrofuran, polyethylene, polycyclohexylethylene, polyethyloxazoline, polycaprolactone, polylactic acid and polyvinyl pyridine.

The boiling point or decomposition point of the pore forming agent is preferably from 100 to 500° C., more preferably from 200 to 450° C., especially preferably from 250 to 400° C. The molecular weight of it is preferably from 200 to 50,000, more preferably from 300 to 10,000, especially preferably from 400 to 5,000.

The amount of it in terms of mass % is preferably from 0.5 to 75%, more preferably from 0.5 to 30%, especially preferably from 1 to 20% relative to the film forming polymer.

The polymer may contain a decomposable group as the pore forming factor. The decomposition point of it is preferably from 100 to 500° C., more preferably from 200 to 450° C., especially preferably from 250 to 400° C. The content of the decomposable group is, in terms of mole %, from 0.5 to 75%, more preferably from 0.5 to 30%, especially preferably from 1 to 20% relative to the film forming polymer.

The low-refractive-index film forming composition of the invention is used for film formation preferably after elimination therefrom of insoluble matters, gel-like components and the like by filtration through a filter. The filter to be used for such a purpose preferably has a pore size of from 0.001 to 0.2 µm, more preferably from 0.005 to 0.05 µm, most preferably from 0.005 to 0.03 µm. The filter is made of preferably PTFE, polyethylene or nylon, more preferably polyethylene or nylon.

A film available using the low-refractive-index film forming composition of the invention can be formed by applying the low-refractive-index film forming composition onto a substrate such as silicon wafer, $SiO_2$ wafer, SiN wafer, glass or plastic film by a desired method such as spin coating, roller coating, dip coating, scan coating, spraying, or bar coating, and then heating to remove the solvent if necessary. As a method of applying the composition to the substrate, spin coating and scan coating are preferred, with spin coating being especially preferred. For spin coating, commercially available apparatuses such as "Clean Track Series" (trade name; product of Tokyo Electron), "D-spin Series" (trade name; product of Dainippon Screen), or "SS series" or "CS series" (each, trade name; product of Tokyo Oka Kogyo) are preferably employed. The spin coating may be performed at any rotation speed, but from the viewpoint of in-plane uniformity of the film, a rotation speed of about 1300 rpm is preferred. When the solution of the composition is discharged, either dynamic discharge in which the solution of the composition is discharged onto a rotating substrate or static discharge in which the solution of the composition is discharged onto a static substrate may be employed. The dynamic discharge is however preferred in view of the in-plane uniformity of the film. Alternatively, from the viewpoint of reducing the consumption amount of the composition, a method of discharging only a main solvent of the composition to a substrate in advance to form a liquid film and then discharging the composition thereon can be employed. Although no particular limitation is imposed on the spin coating time, it is preferably within 180 seconds from the viewpoint of throughput. From the viewpoint of the transport of the substrate, it is preferred to subject the substrate to processing (such as edge rinse or back rinse) for preventing the film from remaining at the edge of the substrate. The heat treatment method is not particularly limited, but ordinarily employed methods such as hot plate heating, heating with a furnace, heating in an RTP (Rapid Thermal Processor) to expose the substrate to light of, for example, a xenon lamp can be employed. Of these, hot plate heating or heating with a furnace is preferred. As the hot plate, a commercially available one, for example, "Clean Track Series" (trade name; product of Tokyo Electron), "D-spin Series" (trade name; product of Dainippon Screen) and "SS series" or "CS series" (trade name; product of Tokyo Oka Kogyo) is preferred, while as the furnace, "α series" (trade name; product of Tokyo Electron) is preferred.

The polymer of the invention is preferably applied onto a substrate, followed by curing. The term "curing" means curing of the composition on the substrate to give the resulting film solvent resistance.

Curing is achieved especially preferably by heat treatment (baking).

For example, polymerization reaction of the vinyl group remaining in the polymer at the time of post heat treatment can be utilized for curing.

When the composition of the invention contains a polymerization initiator, this post heat treatment is performed at a temperature of preferably from 100 to 450° C., more preferably from 200 to 420° C., especially preferably from 350 to 400° C. for a time of preferably from 1 minute to 2 hours, more preferably from 10 minutes to 1.5 hours, especially preferably from 30 minutes to 1 hour. This pot-heat treatment may be performed in several steps. This post heat treatment is performed especially preferably in a nitrogen atmosphere in order to prevent thermal oxidation due to oxygen.

In the invention, curing may be accomplished not by heat treatment but by exposure to high energy radiation to cause the polymerization reaction of vinyl or ethynyl groups remaining in the polymer. Examples of the high energy radiation include, but not limited to, an electron beam, ultraviolet ray and X ray.

When an electron beam is employed as high energy radiation, the energy is preferably from 0 to 50 keV, more preferably from 0 to 30 keV, especially preferably from 0 to 20 keV. Total dose of the electron beam is preferably from 0 to 5 $\mu C/cm^2$, more preferably from 0 to 2 $\mu C/cm^2$, especially preferably from 0 to 1 $\mu C/cm^2$. The substrate temperature when it is exposed to the electron beam is preferably from 0 to 450° C., more preferably from 0 to 400° C., especially preferably from 0 to 350° C. Pressure is preferably from 0 to 133 kPa, more preferably from 0 to 60 kPa, especially preferably from 0 to 20 kPa. The atmosphere around the substrate is preferably an atmosphere of an inert gas such as Ar, He or nitrogen from the viewpoint of preventing oxidation of the polymerized substance of the invention. An oxygen, hydrocarbon or ammonia gas may be added for the purpose of causing a reaction with plasma, electromagnetic wave or chemical species generated by the interaction with the electron beam. In the invention, exposure to the electron beam may be carried out in plural times. In this case, the exposure to the electron beam is not necessarily carried out under the same conditions but the conditions may be changed every time.

An ultraviolet ray may be employed as high energy radiation. The radiation wavelength range of the ultraviolet ray is preferably from 190 to 400 nm, while its output immediately above the substrate is preferably from 0.1 to 2000 $mWcm^{-2}$. The substrate temperature upon exposure to the ultraviolet ray is preferably from 250 to 450° C., more preferably from 250 to 400° C., especially preferably from 250 to 350° C. As the atmosphere around the substrate, an atmosphere of an inert gas such as Ar, He or nitrogen is preferred from the viewpoint of preventing oxidation of the polymerized substance of the invention. The pressure at this time is preferably from 0 to 133 kPa.

Curing may be achieved by carrying out heat treatment and exposure to high energy radiation simultaneously or successively.

When the composition of the invention contains a polymerization initiator, however, curing by heating is achieved preferably by heating for 1 to 180 minutes at a temperature within a range of from 30 to 200° C. Heating in such a manner can efficiently provide an antireflection film excellent in scratch resistance without damaging the substrate or the like. It is therefore preferred to heat the composition for from 2 to 120 minutes within a temperature range of from 50 to 180° C., more preferably for from 5 to 60 minutes within a temperature range of from 80 to 150° C.

When curing is achieved by exposure to radiation, an amount of exposure is adjusted to fall within a range of preferably from 0.01 to 10 J/cm$^2$, more preferably from 0.1 to 5 J/cm$^2$, still more preferably from 0.3 to 3 J/cm$^2$.

When a low-refractive-index film is formed, the thickness of the coated film in terms of a dry film thickness is from approximately 0.05 to 1.5 μm by single application and from approximately 0.1 to 3 μm by double application.

In order to prevent decomposition of the cage structure during baking, it is preferred that a group (such as hydroxyl group or silanol group) nucleophilically attacking Si atoms during the preparation of the composition or low-refractive-index material is substantially absent.

More specifically, the low-refractive-index film can be formed, for example, by applying the composition of the invention onto a substrate (typically, a substrate having metal interconnects thereon) by spin coating, drying the solvent by preliminary heat treatment, and carrying out final heat treatment (annealing) at a temperature of 300° C. or greater but not greater than 430° C. By the above-described process, an optical film having a low refractive index, more specifically, having a refractive index not greater than 1.43, preferably not greater than 1.4 is available.

The antireflection film of the invention will hereinafter be described.

The antireflection film has preferably a reflectance as small as possible. More specifically, it has an average mirror reflectivity of preferably 3% or less, more preferably 2% or less, most preferably 1% or less in a wavelength region of from 450 to 650 nm. The haze of the antireflection film is preferably 3% or less, more preferably 1% or less, most preferably 0.5% or less.

When the low-refractive-index film of the invention is used as a single-layer antireflection film, the refractive index of the antireflection film is preferably $\sqrt{nG}$ supposing that the refractive index of a transparent substrate is nG, which means that it is the square root of the refractive index of a transparent substrate. For example, an optical glass has a refractive index of from 1.47 to 1.92 (wavelength: 633 nm, measured at 25° C.) so that the n of the single-layer antireflection film formed on the optical glass is preferably from 1.21 to 1.38. The antireflection film has a thickness of preferably from 10 nm to 10 μm.

When the low-refractive-index film of the invention is used as a multilayer antireflection film, on the other hand, it may have, below the low-refractive-index layer, a high-refractive-index layer, hard coat layer and transparent substrate. The high-refractive-index layer may be formed directly on the substrate without forming the hard coat layer.

Alternatively, a medium-refractive-index layer may be inserted between the high-refractive-index layer and low-refractive-index layer or between the high-refractive-index layer and hard coat layer.

(1) Low-refractive-index Layer

The low-refractive-index layer is made of a cured film obtained by curing the composition of the invention. The refractive index and thickness of the low-refractive-index layer will next be described.

(i) Refractive Index

A refractive index (wavelength: 633 nm, measured at 25° C.) of a cured film obtained by curing the composition of the invention, that is, a refractive index of the low-refractive-index film is adjusted to preferably 1.43 or less. Use of the low-refractive-index film having a refractive index exceeding 1.43 in combination with a high-refractive-index film may drastically deteriorate the antireflection effects.

Accordingly, the refractive index of the low-refractive-index film is adjusted to more preferably 1.40 or less, still more preferably 1.36 or less.

When plural layers of the low-refractive-index film are formed, it is only necessary that at least one of them has a refractive index falling within the above-described range.

When the antireflection film contains the low-refractive-index layer, it is preferred to adjust a difference in a refractive index between it and the high-refractive-index layer to 0.05 or greater in order to achieve better antireflection effects. When the difference in refractive index between the low-refractive-index layer and the high-refractive-index layer is less than 0.05, these layers fail to exhibit a synergistic effect in an antireflection film layer and moreover, may sometimes deteriorate the antireflection effects.

A difference in the refractive index between the low-refractive-index layer and the high-refractive-index layer is therefore adjusted to more preferably from 0.1 to 0.8, still more preferably from 0.15 to 0.7.

(ii) Thickness

No particular limitation is imposed on the thickness of the low-refractive-index layer and a thickness of, for example, from 20 to 300 nm is preferred. The low-refractive-index layer having a thickness less than 20 nm may sometimes have reduced adhesion to the high-refractive-index layer serving as an underlying layer. The low-refractive-index layer having a thickness exceeding 300 nm, on the other hand, may sometimes have a deteriorated antireflection effects owing to light interference.

The thickness of the low-refractive-index layer is adjusted to more preferably from 20 to 250 nm, still more preferably from 20 to 200 nm.

When a multilayer structure is formed with a plurality of the low-refractive-index layers to achieve higher antireflection properties, the total thickness of them is adjusted to preferably from 20 to 300 nm.

(2) High-refractive-index Layer

Although no particular limitation is imposed on a curable composition for forming the high-refractive-index layer, it may preferably contain, as a film forming component, epoxy resins, phenolic resins, melamine resins, alkyd resins, cyanate resins, acrylic resins, polyester resins, urethane resins and siloxane resins either singly or in combination. Use of these resins makes it possible to form a rigid thin film as the high-refractive-index layer. As a result, an antireflection film having markedly improved scratch resistance can be obtained.

When these resins are used singly, however, the refractive index of the resulting film is usually only from 1.45 to 1.62 and is sometimes insufficient for achieving a high antireflection performance. It is therefore preferred to add inorganic particles having a high refractive index, for example, metal oxide particles to raise the refractive index to from 1.70 to 2.20. A curable composition which can be cured by exposure to heat, ultraviolet ray or electron beam is usable, but a UV-curable composition is preferred because of high productivity.

No particular limitation is imposed on the thickness of the high-refractive-index layer but a thickness of, for example, from 20 to 30,000 nm is preferred. Use of the high-refractive-index layer having a thickness less than 20 nm in combination with the low-refractive-index layer may sometimes deteriorate the antireflection effects or adhesion to the substrate. The high-refractive-index layer having a thickness exceeding 30,000 nm, on the other hand, may sometimes deteriorate the antireflection effects owing to light interference.

The thickness of the high-refractive-index layer is adjusted to more preferably from 20 to 1,000 nm, still more preferably from 50 to 500 nm.

When a multilayer structure is formed with a plurality of the high-refractive-index layers to achieve higher antireflection properties, the total thickness of them is adjusted to preferably from 20 to 30,000 nm.

When a hard coat layer is inserted between the high-refractive-index layer and the substrate, the thickness of the high-refractive-index layer can be adjusted to from 20 to 300 nm.

(3) Hard Coat Layer

No particular limitation is imposed on the material constituting the hard coat layer used for the antireflection film of the invention. Examples of the material include siloxane resins, acrylic resins, melamine resins, and epoxy resins. They may be used either singly or in combination.

Although no particular limitation is imposed on the thickness of the hard coat layer, it is adjusted to preferably from 1 to 50 μm, more preferably from 5 to 10 μm. When the hard coat layer has a thickness less than 1 μm, it is sometimes impossible to improve the adhesion of the antireflection film to the substrate. The hard coat layer having a thickness exceeding 50 μm, on the other hand, may sometimes lack uniformity.

(4) Substrate

No particular limitation is imposed on the kind of the substrate used for the antireflection film of the invention. Examples include transparent substrates made of glass, polycarbonate resin, polyester resin, acrylic resin, triacetyl cellulose (TAC) or the like, and a silicon wafer. An antireflection film containing such a substrate can achieve excellent antireflection effects in the wide application fields such as lens of camera, display of TV (CRT), and color filter of liquid crystal display device or imaging element.

Films available using the composition of the invention can also be utilized as a surface protection film or phase difference film for optical devices.

EXAMPLES

The present invention will hereinafter be described in further detail by Examples.

Synthesis Example 1

To 361 g of ethyl acetate was added 1 g of a mixture (Model Number: OL1170, product of Hybrid Plastics) of a cage-like silsesquioxane composed of 8 $H_2C=CH-Si(O_{0.5})_3$ units, a cage-like silsesquioxane composed of 10 $H_2C=CH-Si(O_{0.5})_3$ units, and a cage-like silsesquioxane composed of 12 $H_2C=CH-Si(O_{0.5})_3$ units. In a nitrogen gas stream, the resulting mixture was heated under reflux (internal temperature: 78° C.). A solution obtained by diluting 4 μl of "Luperox 11" (trade name; product of ARKEMA YOSHITOMI, a ten-hour half-life temperature: 58° C.) with 4 ml of ethyl acetate was added dropwise as a polymerization initiator over 5 hours. After completion of the dropwise addition, the mixture was heated under reflux for 2 hours. The reaction mixture was then cooled to room temperature and then, concentrated under reduced pressure to a liquid weight of 2 g. Then, 20 ml of methanol was added. The mixture was stirred for 1 hour, followed by filtration and drying to yield 0.95 g of solids. The resulting solids were dissolved in 15 ml of tetrahydrofuran and 5.5 ml of water was added dropwise while stirring. Stirring was continued for one hour, followed by filtration and drying to yield 0.52 g of solids. GPC analysis of the solids revealed that components having a molecular weight greater than that of a mixture of cage-like silsesquioxanes, that is, starting materials, had Mn of 51,000, Mw of 138,000 and $M_{z+1}$ of 370,000; components having a molecular weight of 3,000,000 or greater were not contained; and the starting substances which had remained unreacted amounted to 3 mass % or less of the solids. GPC was performed using "Waters 2695" (trade name) and a GPC column "KF-805L" (trade name; product of Shodex), setting a column temperature at 40° C., using tetrahydrofuran as an eluting solvent at a flow rate of 1 ml/min and pouring 50 μl of a tetrahydrofuran solution having a sample concentration of 0.5%. A calibration curve of the monomers was constructed using an integrated value of an RI detector (Waters 2414) and a monomer content in the solids was determined. The Mn, Mw and $M_{z+1}$ were calculated based on a calibration curve constructed using standard polystyrene.

As a result of measurement of $^1$H-NMR spectrum of the solid by using deuterized chloroform as a measuring solvent, proton peaks corresponding to alkyl groups obtained by the polymerization of the vinyl groups and proton peaks corresponding to the remaining vinyl groups were observed at an integration ratio of 43:57. This suggested the polymerization of the vinyl groups.

By adding 5 ml of cyclohexanone to 0.3 g of the composition and stirring at 40° C. for 3 hours, a uniform solution was obtained. The resulting solution was filtered through a filter made of Teflon (trade mark) and having a pore size of 0.2 μm, whereby Composition A was obtained.

From the weight of the remaining monomers and the weight of the additives, it is evident that a polymerized product obtained by the reaction between the vinyl groups of the monomers amounts to 70 mass % or greater of the solids in Composition A.

Synthesis Example 2

To 52.8 g of butyl acetate was added 1 g of Example Compound (1-d) (product of Aldrich). In a nitrogen gas stream, a solution obtained by diluting 4 mg of "V-601" (trade name; product of Wako Pure Chemicals, a ten-hour half-life temperature: 66° C.) with 4 ml of butyl acetate was added dropwise as a polymerization initiator to the resulting mixture over 2 hours while heating under reflux (internal temperature: 127° C.). After completion of the dropwise addition, the mixture was heated under reflux for 1 hour. To the reaction mixture was added 20 mg of 4-methoxyphenol as a polymerization inhibitor. The reaction mixture was then cooled to room temperature and then, concentrated under reduced pressure to a liquid weight of 2 g. Then, 20 ml of methanol was added. After stirring for 1 hour, a solid matter was collected by filtration and dried. The solid matter thus dried was dissolved in 10 ml of tetrahydrofuran and 1.5 ml of water was added dropwise to the resulting solution while stirring. After stirring for one hour, the supernatant was removed by decantation and 10 ml of methanol was added to the residue. By filtration and drying, 0.49 g of solids was obtained. GPC analysis of the solids revealed that components having a molecular weight greater than that of Example Compound (I-d) had Mw of 168,000, $M_{z+1}$ of 390,000 and Mn of 92,000; the Compound (I-d) which had remained unreacted amounted to 3 mass % or less of the solids; and components having a molecular weight of 3,000,000 or greater were not contained. As a result of measurement of $^1$H-NMR spectrum of the solids by using deuterized chloroform as a measuring solvent, proton peaks corresponding to alkyl groups obtained by the polymerization of the vinyl groups and proton peaks corresponding to the remaining vinyl groups were observed at an integration ratio of 48:52. This suggested the polymerization of the vinyl groups.

By adding 5 ml of propylene glycol methyl ether acetate to 0.3 g of the composition and stirring at 40° C. for 3 hours, a uniform solution was obtained. The resulting solution was filtered through a filter made of Teflon (trade mark) and having a pore size of 0.2 μm, whereby Composition B was obtained.

From the weight of the remaining monomers and the weight of the additives, it is evident that a polymerized product obtained by the reaction between the vinyl groups of the monomers amounts to 70 mass % or greater of the solids in Composition B.

Synthesis Example 3

To 26.4 g of butyl acetate was added 1 g of Example Compound (1-d) (product of Aldrich). In a nitrogen gas stream, a solution obtained by diluting 2 mg of "V-601" (trade name; product of Wako Pure Chemicals, a ten-hour half-life temperature: 66° C.) with 2 ml of butyl acetate was added dropwise as a polymerization initiator to the resulting mixture over 2 hours while heating and refluxing (internal temperature: 127° C.). After completion of the dropwise addition, the mixture was heated under reflux for 1 hour. To the reaction mixture was added 20 mg of 4-methoxyphenol as a polymerization inhibitor. The reaction mixture was cooled to room temperature and then, concentrated under reduced pressure to a liquid weight of 2 g. Then, 20 ml of methanol was added. After stirring for 1 hour, a solid matter was collected by filtration and dried. The solid matter thus dried was dissolved in 15 ml of tetrahydrofuran and 5 ml of water was added dropwise to the resulting solution while stirring. After stirring for one hour, the supernatant was removed by decantation and 10 ml of methanol was added to the residue. By filtration and drying, 0.60 g of solids was obtained. GPC analysis of the solids revealed that components having a molecular weight greater than that of Example Compound (I-d) had Mn of 21,000, Mw of 138,000, and $M_{z+1}$ of 270,000; Example Compound (I-d) which had remained unreacted amounted to 3 mass % or less of the solids; and components having a molecular weight of 3,000,000 or greater were not contained. As a result of measurement of $^1$H-NMR spectrum of the solids by using deuterized chloroform as a measuring solvent, proton peaks corresponding to alkyl groups obtained by the polymerization of the vinyl groups and proton peaks corresponding to the remaining vinyl groups were observed at an integration ratio of 42:58. This suggested the polymerization of the vinyl groups.

By adding 5 ml of propylene glycol methyl ether acetate to 0.3 g of the composition and stirring at 40° C. for 3 hours, a uniform solution was obtained. The resulting solution was filtered through a filter made of Teflon (trade mark) and having a pore size of 0.2 μm, whereby Composition C was obtained.

From the weight of the remaining monomer and the weight of the additives, it is evident that a polymerized product obtained by the reaction between the vinyl groups of the monomer amounts to 70 mass % or greater of the solids in Composition C.

Synthesis Example 4

To 13.2 g of butyl acetate was added 1 g of Example Compound (1-d) (product of Aldrich). In a nitrogen gas stream, a solution obtained by diluting 1 mg of "V-401" (trade name; product of Wako Pure Chemicals, a ten-hour half-life temperature: 88° C.) with 1 ml of butyl acetate was added dropwise as a polymerization initiator to the resulting mixture over 2 hours while heating under reflux (internal temperature: 127° C.). After completion of the dropwise addition, the mixture was heated under reflux for 1 hour. To the reaction mixture was added 20 mg of 4-methoxyphenol as a polymerization inhibitor. The reaction mixture was cooled to room temperature and then, concentrated under reduced pressure to a liquid weight of 2 g. Then, 20 ml of methanol was added. After stirring for 1 hour, a solid matter was collected by filtration and dried. The solid matter thus dried was dissolved in 10 ml of tetrahydrofuran and 1.8 ml of water was added dropwise to the resulting solution while stirring. After stirring for one hour, the supernatant was removed by decantation and 10 ml of methanol was added to the residue. By filtration and drying, 0.41 g of solids was obtained. GPC analysis of the solids revealed that components having a molecular weight greater than that of Example Compound (I-d) had Mw of 128,000, $M_{z+1}$ of 380,000 and Mn of 31,000; Example Compound (I-d) which had remained unreacted amounted to 3 mass % or less of the solids; and components having a molecular weight of 3,000,000 or greater were not contained. As a result of measurement of $^1$H-NMR spectrum of the solids by using deuterized chloroform as a measuring solvent, proton peaks corresponding to alkyl groups obtained by the polymerization of the vinyl groups and proton peaks corresponding to the remaining vinyl groups were observed at an integration ratio of 53:47, suggesting the polymerization of the vinyl groups.

By adding 5 ml of propylene glycol methyl ether acetate to 0.3 g of the resulting composition and stirring at 40° C. for 3 hours, a uniform solution was obtained. The resulting solution was filtered through a filter made of Teflon (trade mark) and having a pore size of 0.2 μm, whereby Composition D was obtained.

From the weight of the remaining monomer and the weight of the additives, it is evident that a polymerized product obtained by the reaction of the vinyl groups of the monomer amounts to 70 mass % or greater of the solids in Composition D.

Synthesis Example 5 (Comparative Example)

To 3.5 g of butyl acetate was added 1 g of Example Compound (1-d) (product of Aldrich). In a nitrogen gas stream, a solution obtained by diluting 0.4 mg of "V-601" (trade name; product of Wako Pure Chemicals, ten-hour half-life temperature: 88° C.) with 1 ml of butyl acetate was added dropwise as a polymerization initiator to the resulting mixture over 2 hours while heating and refluxing (internal temperature: 127° C.). After completion of the dropwise addition, the mixture was heated under reflux for 1 hour. The reaction mixture was cooled to room temperature and concentrated under reduced pressure to a liquid weight of 2 g. Then, 20 ml of methanol was added. After stirring for 1 hour, 0.69 g of solids was obtained by filtration and drying. GPC analysis of the solids revealed that components having a molecular weight greater than that of Example Compound (I-d) had Mw of 472,000, $M_{z+1}$ of 1,391,000 and Mn of 6,000; and Compound (I-d) which had remained unreacted amounted to 35 mass % of the solids. Components having a molecular weight of 3,000,000 or greater were contained in an amount of 0.1% as an integrated value of an RI detector.

To 0.3 g of the resulting composition was added 5 ml of cyclohexanone, followed by stirring at 40° C. for 3 hours (Composition E).

[Preparation of Antireflection Film 1]

Compositions A to D prepared in the above Synthesis Examples were applied to a silicon wafer and a slide glass having a thickness of 1 mm by spin coating and the substrates were dried on a hot plate at 130° C. for 1 minute and then at 200° C. for 1 minute. They were then heated at 400° C. for 20 minutes in a clean oven in a nitrogen atmosphere to form films (film thickness: 180 nm).

The refractive index and film thickness were measured at a wavelength of 633 nm on the silicon wafer by using a spectroscopic ellipsometer "VASE" (trade mark; product of JA Woollam).

With regard to a refractive index, a spectral reflectivity at an incidence angle of 5° was measured on the slide glass in a wavelength region of from 380 to 780 nm by using a spectrophotometer (product of JASCO Corporation). An average mirror reflectivity (%) at from 450 to 650 nm was shown as a measurement result.

The results are shown in Table 1.

TABLE 1

| Composition | Condition of coated surface (visual observation) | Film thickness loss | Refractive index | Reflectance (%) |
|---|---|---|---|---|
| A | Good | 0.99 | 1.34 | 0.7 |
| B | Good | 0.98 | 1.32 | 0.6 |
| C | Good | 0.98 | 1.34 | 0.7 |
| D | Good | 0.99 | 1.35 | 0.8 |
| E (Comp. Ex.) | Poor (having many striations) | 0.85 | 1.47 | 1.9 |

Film thickness loss = (film thickness before heating at 400° C. – film thickness after heating at 400° C.)/film thickness after heating at 400° C.

[Preparation of Antireflection Film 2]

To Composition A was added 5 mass %, based on the solids, of "IRGACURE 907" (trade name; product of Ciba Geigy) as a photoradical generator. The resulting film forming composition was applied to a glass substrate and dried. The substrate was exposed to ultraviolet rays at an energy of 750 mJ/cm$^2$ while controlling the oxygen concentration to 0.1%, whereby a film having a thickness of 700 nm was formed.

In a similar manner except for the use of Composition E instead of Composition B, a film of Comparative Example was formed.

Evaluation results are shown in Table 2.

TABLE 2

| Composition | Reflectance (%) |
|---|---|
| A | 1.2% |
| E (Comparative Example) | 2.3% |

[Preparation of Antireflection Film 3]

"RASA TI" (trade name; product of Rasa Industries) was applied onto a silicon wafer by spin coating, followed by baking at 350° C., whereby a film having a thickness of 60 nm and a refractive index of 2.0 was formed. Composition B was then applied onto the resulting film after controlling its concentration to give a film thickness after baking of 20 nm. The substrate was then dried at 130° C. for 1 minute and 200° C. for 1 minute on a hot plate. The substrate was heated further at 350° C. for 60 minutes in a clean oven in a nitrogen atmosphere, whereby a multilayer antireflection film was formed.

In a similar manner except for the use of Composition E instead of Composition B, a multilayer antireflection film of Comparative Example was formed. Evaluation results are shown in Table 3.

TABLE 3

| Composition | Reflectance |
|---|---|
| B | 2.8% |
| E (Comparative Example) | 4.7% |

It is apparent from the results shown in Tables 1 to 3 that use of the compositions of the invention enables the formation of films having a good surface condition when the compositions are applied to a substrate, a small film thickness loss during curing, a low refractive index and a small reflectance.

The present invention makes it possible to form a film which causes less film shrinkage and degassing during curing, has an adequate film thickness, has a low refractive index, and is excellent in film properties such as film strength and is therefore suited for use as an antireflection film in optical devices.

The entire disclosure of each and every foreign patent application from which the benefit of foreign priority has been claimed in the present application is incorporated herein by reference, as if fully set forth.

What is claimed is:

1. An antireflection film forming composition, comprising:
    a polymerized product of Compound (I) having m number of RSi(O$_{0.5}$)$_3$ units, in which m stands for an integer of from 8 to 16, and Rs each independently represents a non-hydrolyzable group, with the proviso that at least two of Rs each represents a vinyl- or ethynyl-containing group,
    wherein each of the RSi(O$_{0.5}$)$_3$ units is linked to another RSi(O$_{0.5}$)$_3$ unit while having an oxygen atom in common and constitutes a cage structure; and
    a photopolymerization initiator selected from the group consisting of, acetophenonebenzylketal, anthraquinone, 1-(4-isopropylphenyl)-2-hydroxy-2-methylpropan-1-one, carbazole, xanthone, 4-chlorobenzophenone, 4,4'-diaminobenzophenone, 1,1-dimethoxydeoxybenzoin, 3,3'-dimethyl-4-methoxybenzophenone, thioxanthone, 2,2-dimethoxy-2-phenylacetophenone, 1-(4-dodecylphenyl)-2-hydroxy-2-methylpropan- 1-one, 2-methyl-1-[4-(methylthio) phenyl]-2-morpholinopropan-1-one, triphenylamine, 2,4,6-trimethylbenzoyldiphenylphosphine oxide, 1-hydroxycyclohexylphenylketone, 2-hydroxy-2-methyl-1-phenylpropan-1-one, fluorenone, fluorene, benzaldehyde, benzoinethylether, benzoinpropylether, benzophenone, Michler's ketone, 3-methylacetophenone, 3,3',4,4'-tetra(tert-butylperoxycarbonyl) benzophenone, 2-(dimethylamino)-[1-[4-(morpholinyl)phenyl]-2-phenylmethyl]-1butanone, 4-benzoyl-4'-methyldiphenylsulfide, and a combination of 3,3',4,4'-tetra(tert-butylperoxycarbonyl)benzophenone with a pigment sensitizer, and
    wherein, of solids contained in the composition, the polymerized product obtained by a polymerization reaction of Compound (I) amounts to 60 mass % or greater and Compound (I) amounts to 15 mass % or less, and further wherein, in the solids component of the composition, from 10 to 90 mol % of the vinyl or ethynyl groups of Compound (I) remain unreacted.

2. The antireflection film forming composition according to claim 1,
    wherein a portion of a GPC chart of the solids contained in the composition from which the monomer Compound (I) is eliminated has a polystyrene-equivalent number-average molecular weight of 10,000 or greater and a polystyrene-equivalent weight average molecular weight of 300,000 or less.

3. The antireflection film forming composition according to claim 1,
wherein the polymerized product is obtained by dissolving Compound (I) in an organic solvent to give a concentration of 15 mass % or less; and then
reacting the vinyl or ethynyl groups in presence of a polymerization initiator.

4. The antireflection film forming composition according to claim 3,
wherein the polymerized product is obtained by adding the polymerization initiator in portions or successively while keeping a temperature of a reaction mixture containing Compound (I) and the organic solvent at one-hour half-life temperature of the polymerization initiator or greater.

5. The antireflection film forming composition according to claim 3,
wherein the organic solvent for polymerization is a solvent having an ester group in a molecule thereof.

6. The antireflection film forming composition according to claim 3,
wherein the polymerization initiator is an azo compound.

7. The antireflection film forming composition according to claim 6,
wherein the polymerization initiator is an azoester compound.

8. The antireflection film forming composition according to claim 1, further comprising an organic solvent.

9. The antireflection film forming composition according to claim 1,
wherein based on a GPC chart of the solids contained in the composition, the solids are substantially free of a component having a molecular weight of 3,000,000 or greater.

10. An antireflection film obtained from the composition according to claim 1.

11. An antireflection film obtained by a process comprising:
applying the composition according to claim 1 onto a substrate; and then
curing the composition.

12. An antireflection film, comprising:
the antireflection film according to claim 10; and
a film having a refractive index higher by at least 0.05 than that of the antireflection film according to claim 10.

13. An optical device, comprising the antireflection film according to claim 12.

14. The antireflection film forming composition according to claim 1, wherein the photopolymerization initiators is added in an amount of from 0.01 to 20 mass % based on the polymerized product of Compound (I).

15. The antireflection film forming composition according to claim 1, further comprising: a solvent that is a single solvent or a mixture of solvents selected from the group consisting of ethylene dichloride, cyclohexanone, cyclopentanone, 2-heptanone, methyl isobutyl ketone, γ-butyrolactone, methyl ethyl ketone, methanol, ethanol, dimethylimidazolidinone, ethylene glycol monomethyl ether, ethylene glycol monoethyl ether, ethylene glycol dimethyl ether, 2-methoxyethyl acetate, ethylene glycol monoethyl ether acetate, propylene glycol monomethyl ether, propylene glycol monomethyl ether acetate, tetraethylene glycol dimethyl ether, triethylene glycol monobutyl ether, triethylene glycol monomethyl ether, isopropanol, ethylene carbonate, ethyl acetate, butyl acetate, methyl lactate, ethyl lactate, methyl methoxypropionate, ethyl ethoxypropionate, methyl pyruvate, ethyl pyruvate, propyl pyruvate, N,N-dimethylformamide, dimethylacetamide, dimethylsufloxide, N-methylpyrrolidone, tetrahydrofuran, diisopropylbenzene, toluene, xylene, and mesitylene.

16. The antireflection film forming composition according to claim 15, wherein the solvent is a single solvent or a mixture of solvents selected from the group consisting of propylene glycol monomethyl ether acetate, propylene glycol monomethyl ether, 2-heptanone, cyclohexanone, γ-butyrolactone, ethylene glycol monomethyl ether, ethylene glycol monoethyl ether, ethylene glycol monoethyl ether acetate, propylene glycol monomethyl ether, propylene glycol monoethyl ether, ethylene carbonate, butyl acetate, methyl lactate, ethyl lactate, methyl methoxypropionate, ethyl ethoxypropionate, N-methylpyrrolidone, N,N-dimethylformamide, tetrahydrofuran, methyl isobutyl ketone, xylene, mesitylene and diisopropylbenzene.

17. A process for producing an antireflection film, comprising: applying the composition according to claim 1 onto a substrate; and then curing the composition.

18. The antireflection film forming composition according to claim 1, wherein the photopolymerization initiator is selected from the group consisting of 2,2-dimethoxy-2-phenylacetophenone, 2-hydroxy-2-methyl-1-phenylpropan-1-one, 1-hydroxycyclohexylphenylketone, 2,4,6-trimethylbenzoyldiphenylphosphine oxide 2-methyl-1-[4-(methylthio) phenyl]-2-morpholinopropan-1-one, and 2-(dimethylamino)-1-[4-(morpholinyl)phenyl-2-phenylmethyl]-1-butanone.

19. The antireflection film forming composition according to claim 1, wherein the photopolymerization initiator is selected form the group consisting of 1-hydroxycyclohexylphenylketone, 2-methyl-1-[4-(methylthio) phenyl]-2-morpholinopropan-1-one, and 2-(dimethylamino)-1-[4-(morpholinyl) phenyl-2-phenylmethyl]-1-butanone.

* * * * *